United States Patent
DeLuca et al.

(10) Patent No.: US 10,755,415 B2
(45) Date of Patent: *Aug. 25, 2020

(54) DETECTING AND MONITORING A USER'S PHOTOGRAPHS FOR HEALTH ISSUES

(71) Applicant: INTERNATIONAL BUSINESS MACHINES CORPORATION, Armonk, NY (US)

(72) Inventors: Lisa Seacat DeLuca, Baltimore, MD (US); Jenny S. Li, Cary, NC (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,389

(22) Filed: Jul. 24, 2019

(65) Prior Publication Data

US 2019/0347799 A1 Nov. 14, 2019

Related U.S. Application Data

(63) Continuation of application No. 15/964,581, filed on Apr. 27, 2018.

(51) Int. Cl.
| | | |
|---|---|---|
| *G06K 9/00* | (2006.01) | |
| *G06T 7/00* | (2017.01) | |
| *G06T 7/90* | (2017.01) | |

(52) U.S. Cl.
CPC ........ *G06T 7/0016* (2013.01); *G06K 9/00255* (2013.01); *G06T 7/90* (2017.01);
(Continued)

(58) Field of Classification Search
CPC ..................... G06T 7/0016; G06T 7/90; G06T 2207/10024; G06T 2207/20132;
(Continued)

(56) References Cited

U.S. PATENT DOCUMENTS 7,613,621 B2 * 11/2009 Brown .................. G06F 19/325
705/2
2002/0181752 A1 12/2002 Wallo et al.
(Continued)

FOREIGN PATENT DOCUMENTS

| CN | 104257349 A | 1/2015 |
| CN | 105225095 A | 1/2016 |
| WO | 2017084428 A1 | 5/2017 |

OTHER PUBLICATIONS

IBM, List of IBM Patents or Patent Applications Treated as Related, Appendix P, dated Jul. 29, 2019, 2 pages.
(Continued)

*Primary Examiner* — Jonathan S Lee
(74) *Attorney, Agent, or Firm* — Jordan T. Schiller

(57) ABSTRACT

A method for analyzing a physical condition based on at least two images. The method selects a plurality of images based on a time lapse interval associated with the plurality of images and a specific physical characteristic being monitored. The method further detects a degree of change in the specific physical characteristic being monitored, wherein the degree of change comprises a change in one or more pixel patterns of at least one image within the plurality of images correlated with the specific physical characteristic being monitored, based on the time lapse interval associated with the plurality of images. The method further displays an alert in response to the degree of change exceeding a prescribed threshold for the specific physical characteristic being monitored.

6 Claims, 5 Drawing Sheets

(52) U.S. Cl.
CPC ............... *G06T 2207/10024* (2013.01); *G06T 2207/20132* (2013.01); *G06T 2207/30088* (2013.01); *G06T 2207/30201* (2013.01)

(58) Field of Classification Search
CPC .......................................... G06T 2207/30088; G06T 2207/30201; G06K 9/00255
USPC ........................................................ 382/128
See application file for complete search history.

(56) References Cited

U.S. PATENT DOCUMENTS

| | | | | |
|---|---|---|---|---|
| 2012/0157800 | A1* | 6/2012 | Tschen | A61B 5/444 600/306 |
| 2014/0125787 | A1* | 5/2014 | Christiansen, II | A61B 5/0059 348/77 |
| 2014/0313303 | A1* | 10/2014 | Davis | A61B 5/0077 348/77 |
| 2016/0006941 | A1 | 1/2016 | Kim | |
| 2016/0055760 | A1* | 2/2016 | Mirabile | G16H 10/20 434/236 |
| 2016/0189499 | A1 | 6/2016 | Allen | |
| 2016/0217565 | A1 | 7/2016 | Mozer et al. | |
| 2017/0007167 | A1 | 1/2017 | Kostic et al. | |
| 2017/0032223 | A1 | 2/2017 | Zingaretti et al. | |
| 2017/0270350 | A1 | 9/2017 | Maltz et al. | |
| 2017/0272741 | A1 | 9/2017 | Maltz et al. | |
| 2018/0310890 | A1* | 11/2018 | Li | G06F 19/00 |

OTHER PUBLICATIONS

Pending U.S. Appl. No. 15/964,581, filed Apr. 27, 2018, entitled: "Detecting and Monitoring a User's Photographs for Health Issues".
Guff, "HGTV Star Saved by Fan Who Noticed a Lump on His Neck," HuffPost Entertainment, Nov. 23, 2015, p. 1-2, https://www.huffingtonpost.com/entry/hgtv-star-saved-by-viewer-cancer_us_565339ade4b0879a5b0ba10d, Accessed on Apr. 17, 2018.
Medicinenet, "Symptom Checker: Symptoms & Signs A-Z," WebMD Symptom Checker, Last Updated Mar. 30, 2018, p. 1-3, WebMD, LLC., https://www.medicinenet.com/symptoms_and_signs/symptomchecker.htm#introView, Accessed on Apr. 17, 2018.
Mell et al., "The NIST Definition of Cloud Computing," National Institute of Standards and Technology, Sep. 2011, p. 1-3, Special Publication 800-145.

* cited by examiner

US 10,755,415 B2

DETECTING AND MONITORING A USER'S PHOTOGRAPHS FOR HEALTH ISSUES

BACKGROUND

Embodiments of the present invention relate generally to the field of computing and more particularly to data processing and analyzing images, over a period of time, for detecting and monitoring health issues.

Individuals may not be aware of minor changes in their own physical condition, or of others, on a daily basis. For example, a blemish on one's skin, a change in color of one's pimple, an increase in small wrinkles, and a slight tilt of one's posture may all be examples of health issues that increase gradually over time and go unnoticed by ourselves, our family, and our friends.

In the digital age of today's world, a majority of people use mobile devices with built-in cameras, have social media accounts, and post photographs of themselves and others to their social media accounts, to be shared with friends and family. Additionally, friends and family post photographs of others, to be shared across social media.

The current state of the art in photographic analysis does not provide for analyzing images, over a period of time, for detecting and monitoring health issues.

SUMMARY

Embodiments of the invention include a method, computer program product, and system, for analyzing images, over a period of time, for detecting and monitoring health issues.

A method, according to an embodiment of the invention, selects a plurality of images based on a time lapse interval associated with the plurality of images and a specific physical characteristic being monitored. The method further detects a degree of change in the specific physical characteristic being monitored, wherein the degree of change comprises a change in one or more pixel patterns of at least one image within the plurality of images correlated with the specific physical characteristic being monitored, based on the time lapse interval associated with the plurality of images. The method further displays an alert in response to the degree of change exceeding a prescribed threshold for the specific physical characteristic being monitored.

A computer program product, according to an embodiment of the invention, includes a non-transitory tangible storage device having program code embodied therewith. The program code is executable by a processor of a computer to perform a method. The method selects a plurality of images based on a time lapse interval associated with the plurality of images and a specific physical characteristic being monitored. The method further detects a degree of change in the specific physical characteristic being monitored, wherein the degree of change comprises a change in one or more pixel patterns of at least one image within the plurality of images correlated with the specific physical characteristic being monitored, based on the time lapse interval associated with the plurality of images. The method further displays an alert in response to the degree of change exceeding a prescribed threshold for the specific physical characteristic being monitored.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method selects a plurality of images based on a time lapse interval associated with the plurality of images and a specific physical characteristic being monitored. The method further detects a degree of change in the specific physical characteristic being monitored, wherein the degree of change comprises a change in one or more pixel patterns of at least one image within the plurality of images correlated with the specific physical characteristic being monitored, based on the time lapse interval associated with the plurality of images. The method further displays an alert in response to the degree of change exceeding a prescribed threshold for the specific physical characteristic being monitored.

DETAILED DESCRIPTION

The present invention discloses a method to use photographic analysis of a user's photographic images stored on a user's mobile device, in the cloud, on a third party server, or from social media, over a period of time, to detect new or changed health issues of a user. Some example health conditions may include sun damage, tumors, weight gain, hair issues, and so forth.

Many people have medical conditions for which they must monitor their physical condition, or are susceptible to diseases that slowly alter their physical condition, often at a pace that may not be evident to the human eye on a day-to-day basis. Slow, gradual physical changes over time may be signs of a disease onset.

The present invention is a way for a user's photos of themselves, stored on their own mobile devices or computer, as well as the user's social media photographic presence to be monitored on a day-to-day basis, or at an alternative pre-configured time lapse interval, for signs of gradual physical changes that may signal specific disease onset.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
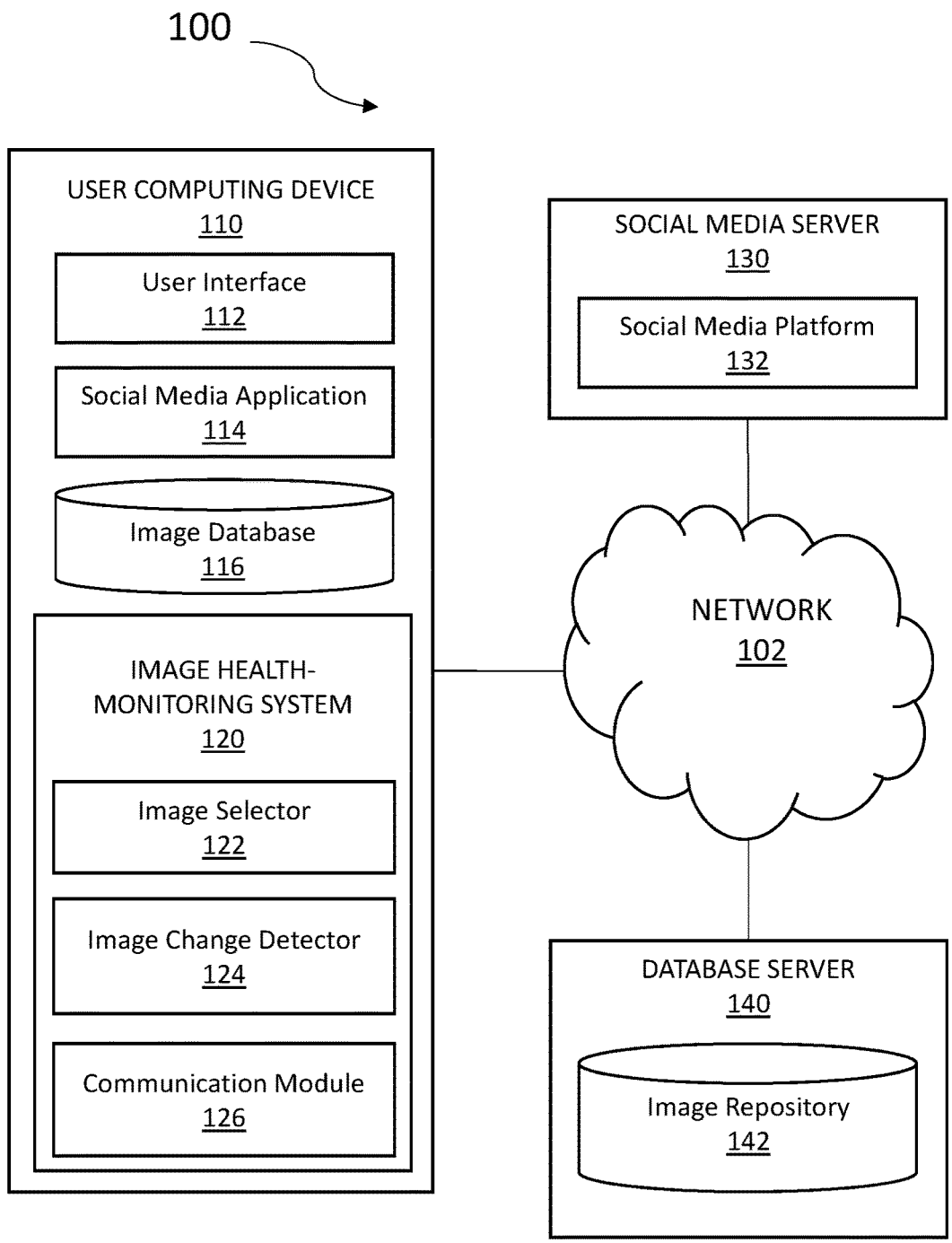
FIG. 1 illustrates an image health-monitoring computing environment, in accordance with an embodiment of the present invention.

FIG. 1 illustrates image health-monitoring computing environment 100, in accordance with an embodiment of the present invention. Image health-monitoring computing environment 100 includes user computing device 110, social media server 130, and database server 140 all connected via network 102. The setup in FIG. 1 represents an example embodiment configuration for the present invention, and is not limited to the depicted setup in order to derive benefit from the present invention.

In an example embodiment, user computing device 110 includes user interface 112, social media application 114, image database 116, and image health-monitoring system 120. In various embodiments, user computing device 110 may be a laptop computer, tablet computer, netbook computer, personal computer (PC), a desktop computer, a personal digital assistant (PDA), a smart phone, or any programmable electronic device capable of communicating with social media server 130 and database server 140 via network 102. User computing device 110 may include internal and external hardware components, as depicted and described in further detail below with reference to FIG. 3. In other embodiments, user computing device 110 may be implemented in a cloud computing environment, as described in relation to FIGS. 4 and 5, herein. User computing device 110 may also have wireless connectivity capabilities allowing it to communicate with social media server 130, database server 140, and other computers or servers over network 102.

In the example embodiment, user computing device 110 includes user interface 112, which may be a computer program that allows a user to interact with user computing device 110 and other connected devices via network 102. For example, user interface 112 may be a graphical user interface (GUI). In addition to comprising a computer program, user interface 112 may be connectively coupled to hardware components, such as those depicted in FIG. 3, for receiving user input. In the example embodiment, user interface 112 is a web browser, however in other embodiments user interface 112 may be a different program capable of receiving user interaction and communicating with other devices.

In the example embodiment, social media application 114 may be a computer program, on user computing device 110, that is capable of receiving natural language text input of a user, location identifier of a user, streaming/live video of a user, photographs of a user, check-ins at restaurant/bar/stadium establishments, and so forth, from a user, which may be consolidated and analyzed and provide a glimpse into social activity patterns of a user. The more frequently, consistently, and accurately a user interacts with a social media application 114, the more genuine of a measurement of social patterns (e.g. when a person eats, sleeps, engages in social events) for a user may be obtained.

In the example embodiment, user computing device 110 includes image database 116, which may be a local storage database for storing a collection of images for a user, taken from user computing device 110 or any device connected to user computing device 110. In exemplary embodiments, image database 116 may be organized according to date, location, facial recognition, metadata tags, favorite images, videos, selfies, or in any other fashion known to one of ordinary skill in the art.

With continued reference to FIG. 1, social media server 130 includes social media platform 132, and may be a laptop computer, tablet computer, netbook computer, personal computer (PC), a desktop computer, a personal digital assistant (PDA), a smart phone, a server, or any programmable electronic device capable of communicating with user computing device 110 and database server 140 via network 102. While social media server 130 is shown as a single device, in other embodiments, social media server 130 may be comprised of a cluster or plurality of computing devices, working together or working separately. Social media server 130 may include internal and external hardware components, as depicted and described in further detail below with reference to FIG. 3. In other embodiments, social media server 130 may be implemented in a cloud computing environment, as described in relation to FIGS. 4 and 5, herein. Social media server 130 may also have wireless connectivity capabilities allowing it to communicate with user computing device 110, database server 140, and other computers or servers over network 102.

In an exemplary embodiment, social media platform 132 may be a website capable of hosting social media content shared between registered users, including user profiles, uploaded images of users, and social media posts. For example, social media platform 132 may be capable of receiving manually input status updates of a user, location of a user, posted images (i.e. photographs) or videos of a user, natural language comments and timestamps associated with a posted image or video of a user, status update, and/or location of a user, streaming/live video, check-ins at restaurant/bar/stadium establishments, and so forth, from a user, which may be consolidated and analyzed and provide a glimpse into personality traits, social activity patterns, dietary patterns, and outward physical health appearances of a user. The more frequently, consistently, and accurately a user interacts with a social media application (e.g. social media platform 132) the more genuine of a measurement of personality traits, social activity patterns, dietary patterns, and outward physical health appearances of a user may be obtained.

In an exemplary embodiment, social media platform 132 is accessed via an internet browser, such as user interface 112 on user computing device 110. In other embodiments, however, social media platform 132 may be accessed via other means, or may be a standalone program.

In various embodiments, social media platform 132 may be a collection of files, including, but not limited to, for example, HTML files, CSS files, XML files, image files and JavaScript files. Social media platform 132 may also include other resources such as audio files and video files. In an exemplary embodiment, social media platform 132 may be a social media website such as Facebook® (Facebook is a registered trademark of Facebook, Inc.), Twitter® (Twitter is a registered trademark of Twitter, Inc.), LinkedIn® (LinkedIn is a registered trademark of LinkedIn Corporation), or Instagram® (Instagram is a registered trademark of Instagram, LLC).

With continued reference to FIG. 1, database server 140 includes image repository 142 and may be a laptop computer, tablet computer, netbook computer, personal computer (PC), a desktop computer, a personal digital assistant (PDA), a smart phone, a server, or any programmable electronic device capable of communicating with user computing device 110 and social media server 130 via network 102. While database server 140 is shown as a single device, in other embodiments, database server 140 may be comprised of a cluster or plurality of computing devices, working together or working separately. Database server 140 may include internal and external hardware components, as depicted and described in further detail below with reference to FIG. 3. In other embodiments, database server 140 may be implemented in a cloud computing environment, as described in relation to FIGS. 4 and 5, herein. Database server 140 may also have wireless connectivity capabilities allowing it to communicate with user computing device 110, social media server 130, and other computers or servers over network 102.

In an exemplary embodiment, image repository 142 may be a database for storing a collection of images for a user, for example images that are stored on a cloud. In exemplary embodiments, image repository 142 may include a user's images that span multiple years and may be organized according to date, location, facial recognition, metadata tags, favorite images, videos, selfies, or in any other fashion known to one of ordinary skill in the art. In alternative embodiments, image repository 142 may store selected images that depict a change in a specific physical characteristic being monitored by image health-monitoring system 120 over a period of time, and categorize the images according to the specific physical characteristic being monitored. For example, if a user wants to monitor their weight gain/loss or a lump on their neck over the course of 6 months, full body photographs, or photographs that capture the lump, of the user may be selected and stored in chronological order, by date, in image repository 142 under category <user_weight> or <user_lump>, respectively.

In various embodiments, image repository 142 is capable of being stored on image health-monitoring system 120, or user computing device 110, as a separate database.

With continued reference to FIG. 1, image health-monitoring system 120, in the example embodiment, may be a computer application on user computing device 110 that contains instruction sets, executable by a processor. The instruction sets may be described using a set of functional modules. Image health-monitoring system 120 receives input from social media application 114, image database 116, social media server 130, and database server 140. In alternative embodiments, image health-monitoring system 120 may be a standalone program on a separate electronic device or server.

In an exemplary embodiment, the functional modules of image health-monitoring system 120 include image selector 122, image change detector 124, and communication module 126.

With continued reference to FIG. 1, image health-monitoring system 120 is capable of selecting a plurality of images based on a time lapse interval associated with the plurality of images and a specific physical characteristic being monitored. Image health-monitoring system 120 is further capable of detecting a degree of change in the specific physical characteristic being monitored, wherein the degree of change comprises a change in one or more pixel patterns of at least one image within the plurality of images correlated with the specific physical characteristic being monitored, based on the time lapse interval associated with the plurality of images. Image health-monitoring system 120 is further capable of displaying an alert in response to the degree of change exceeding a prescribed threshold for the specific physical characteristic being monitored.

Figure 2:
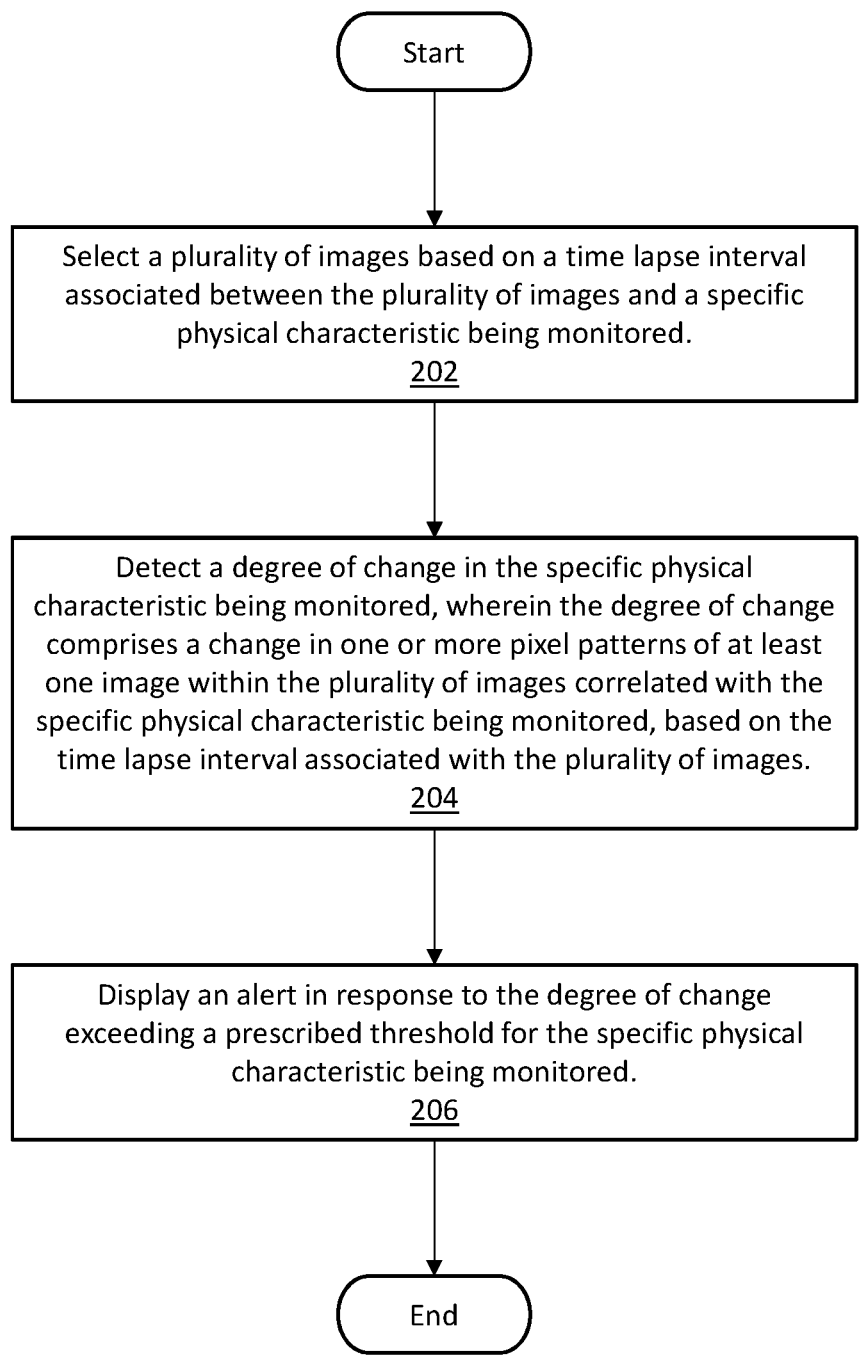
FIG. 2 is a flowchart illustrating the operation of image health-monitoring system 120 of FIG. 1, in accordance with an embodiment of the present invention.

FIG. 2 is a flowchart illustrating the operation of image health-monitoring system 120 of FIG. 1, in accordance with an embodiment of the present invention.

With reference to FIGS. 1 and 2, image selector 122 includes a set of programming instructions, in image health-monitoring system 120, to select a plurality of images based on a time lapse interval associated between the plurality of images and a specific physical characteristic being monitored (step 202). In exemplary embodiments, a specific physical characteristic being monitored may be automatically detected by image health-monitoring system 120 (e.g. changes in consistency throughout a plurality of images over time), or customizable by a user. Examples of specific physical characteristics being monitored in selected images may include hair loss, tumor growth, weight gain, sun damage, and any other physical condition that may be detected externally on a person over time.

In exemplary embodiments, a time lapse interval associated with the plurality of images is customizable based on a specific health issue to be monitored. The time lapse interval may include a span of time that image health-monitoring system 120 is configured to monitor a specific physical characteristic of a user, from as short as a few hours or less to as long as a few years or more. Selected images, either from image database 116, image repository 142, or social media platform 132, may contain date-stamp and time-stamp metadata to identify when an image was captured. In alternative embodiments, captured images may be automatically stored in chronological order in image database 116 and image repository 142. For example, a user may configure image health-monitoring system 120 to analyze a small lump on their neck over a six-month period of time, or customize a monthly monitoring of a user's skin pigmentation. In alternative embodiments, in the absence of any customized user preferences, image health-monitoring system 120 may have a default pre-configuration to continuously monitor the selected images of a user for any notable changes in any physical characteristics of the user.

In exemplary embodiments, a user may take photographs via user computing device 110 (e.g. a smartphone with a built-in camera) and automatically store the captured photographs in image database 116. In alternative embodiments, a user may take digital photographs with a classic camera (i.e. a single-lens reflex (SLR) camera), or any other device capable of taking photographs, and upload the digital photographs to user computing device 110. In further alternative embodiments, image health-monitoring system 120 may be paired with automatic selfie tools such as technological gadgets that are capable of taking photographs of a user for alternative purposes such as suggesting articles of clothing to wear.

In exemplary embodiments, the captured photographs may include images of nature, friends, family members, and the user themselves. A "selfie" photograph refers to an image that a user takes of him or herself using his or her own camera. A user may use the captured photographs in various ways. For example, a user may organize a library in image database 116 or image repository 142, send one or more images to others via private text message or e-mail, post one or more images to a social media platform 132, and so forth. Similarly, a friend or family member may take one or more photographs of a user and send the one or more photographs to the user via private text message or e-mail, or tag the user in the photograph on a social media post. In various embodiments, a user may be detected in photographs, without being tagged, on social media posts and in photographs on his/her device, via image/facial recognition analysis techniques known to one of ordinary skill in the art.

In various embodiments, image selector 122 may be capable of mining a plurality of sources, wherein the plurality of sources is selected from a group consisting of a social media application 114 or social media platform 132, user computing device 110, and a third party server such as database server 140, containing image repository 142. In exemplary embodiments, image selector 122 mines for images of the user, particularly images of the user where a specific physical characteristic being monitored is optimally represented in each image. For example, in the case of the lump on a user's neck being monitored for changes in size, image selector 122 may select identified images of the user with his/her neck exposed (e.g. user at the beach, user at a party, and so forth) as opposed to images of the user with his/her neck covered up (i.e. user skiing, user wearing a turtle-neck, and so forth). Image selector 122 further coordinates the selected images of the user with the specific physical characteristic being represented, together with the date and time of the selected images.

In alternative embodiments, comments associated with a social media post (e.g. image, video, etc.) may provide an indication that the social media post depicts the individual user. Further, image selector 122 may utilize a natural language text processing tool that is capable of identifying an individual user in a social media post, electronic mail content, or any other digital content known to one of ordinary skill in the art (e.g. natural language text) by identifying the individual's name, identifying a snippet of text describing a health concern of the user, or a comment on a posted image that references a specific physical characteristic (e.g. lump, skin pigmentation, sunburn, etc.) of the user.

With continued reference to FIGS. 1 and 2, image change detector 124 includes a set of programming instructions, in image health-monitoring system 120, to detect a degree of change in the specific physical characteristic being monitored, wherein the degree of change comprises a change in one or more pixel patterns of at least one image within the plurality of images correlated with the specific physical characteristic being monitored, based on the time lapse interval associated with the plurality of images (step 204).

In exemplary embodiments, image change detector 124 is capable of normalizing the selected plurality of images based on the specific physical characteristic being monitored. Normalizing the selected plurality of images may include, but is not limited to, the following various techniques well known to one of ordinary skill in the art, such as adjusting the brightness of the at least one image within the selected plurality of images, cropping the at least one image, within the selected plurality of images, to focus on the specific physical characteristic being monitored, and rotating the at least one image within the selected plurality of images.

In exemplary embodiments, image change detector 124 normalizes each selected image to enable optimum comparison. For example, if a user is interested in a change in their skin pigmentation over a three-month period, then adjusting the brightness of two or more comparative images may play a critical role in determining whether there is actually a skin pigmentation change to be concerned about.

In various embodiments, image change detector 124 may not have a large enough sample size of images for a specific physical characteristic being monitored, either for a specific time interval period or in total. As such, image change detector 124 may be capable of instructing a user to take a new image of the specific physical characteristic being monitored. For example, referring back to the lump on a user's neck, the user may not have any clear, recent images of his/her neck due to the cold winter season and all images of the user are outdoors where the user is wearing a puffy winter coat. As such, image change detector 124 may send the user an instruction, via communication module 126, to take a current image (i.e. "selfie") indoors, over a span of a certain number of days, weeks, or months (i.e. depending on the customized time lapse interval) where a clear picture of the lump on the user's neck may be captured.

In exemplary embodiments, image change detector 124 may be capable of creating a comparison of the selected plurality of images for a specific physical characteristic being monitored, noting the degree of change between the selected plurality of images of the specific physical characteristic being monitored. The degree of change may be measured by the number of pixel changes (e.g. color, size, etc.) for a specific physical characteristic, after normalization of the images. With continued reference to the example above, a lump on the user's neck, image change detector 124 may compare selected images of the lump on the user's neck over the course of three months, where four images of the user's neck per month are captured (i.e. one image per week). Image change detector 124, after normalizing the selected images, may detect that the lump encompasses one additional pixel in each chronological selected image with each passing week. Image change detector 124 may determine that the lump on the user's neck increases at a 5% change per month based on the comparison of the selected images.

In exemplary embodiments, image change detector 124 may be capable of comparing the selected plurality of images with a medical encyclopedia database of images. In further embodiments, image change detector 124 may be pre-configured with medical knowledge, or even a user's own medical records, with reference to specific external physical characteristics being monitored for the user, and contain threshold values (i.e. percentage change of the specific physical characteristic over the time lapse interval) for when to alert the user based on detected changes of the specific physical characteristic (e.g. skin pigmentation, lump sizes, blemishes on skin, and so forth).

In exemplary embodiments, in response to the degree of change exceeding the prescribed threshold, image health-monitoring system 120 may mine one or more user activities from the plurality of selected images, geographic location, and social network postings for information correlating to the degree of change in the specific physical characteristic being monitored. Image health-monitoring system 120 may further determine that the one or more user activities correlate with the degree of change in the specific physical characteristic being monitored, and display preventative health information to a user based on the determined one or more user activities that correlate with the degree of change in the specific physical characteristic being monitored.

For example, image change detector 124 may detect that the user has a significant hair loss problem. Image health-monitoring system 120 may then mine one or more of the user's activities and find out that the user spends too many hours sitting in his/her office at his/her desk, by keeping track of GPS information of the user over the last three months. Image health-monitoring system 120 may also detect that the user has been visiting fast food restaurants more often, and the user has not been sleeping well. Image health-monitoring system 120 may then compare all of this information to medical databases and alert the user that his/her current lifestyle may be leading to his/her significant hair loss problem.

With continued reference to FIGS. 1 and 2, communication module 126 includes a set of programming instructions, in image health-monitoring system 120, to display an alert in response to the degree of change exceeding a prescribed threshold for the specific physical characteristic being monitored (step 206).

In exemplary embodiments, communication module 126 may communicate with user computing device 110 by displaying a description of a potential health concern, together with a confidence level of the health concern, based on a degree of change exceeding a prescribed threshold for a specific physical characteristic, of the user, being monitored.

In further embodiments, communication module 126 may display, to the user via user computing device 110, a link to the selected plurality of images depicting the progression of change over time with reference to the specific physical characteristic being monitored. Communication module 126 may also provide a link to the user to learn more about the potential health concern.

In alternative embodiments, communication module 126 may display, to the user via user computing device 110, a link to the user's insurance benefits, provider options, preferred medical treatments, local medical professionals that specialize in a particular relevant medical treatment, and any other personalized data.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between user computing device 110, social media server 130, and database server 140.

Figure 3:
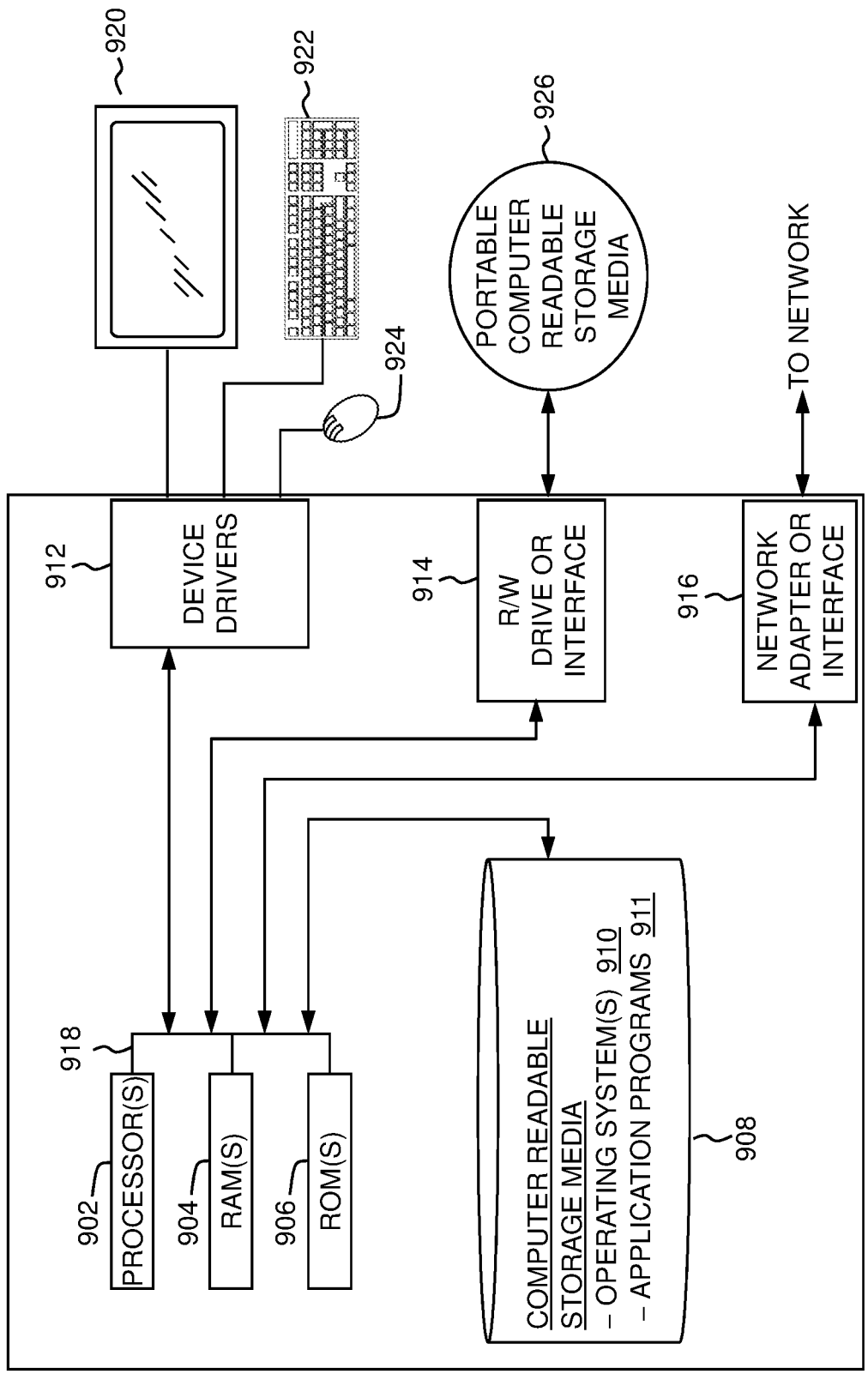
FIG. 3 is a diagram graphically illustrating the hardware components of image health-monitoring system 120 of FIG. 1, in accordance with an embodiment of the present invention.

FIG. 3 is a block diagram depicting components of a computing device in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as image health-monitoring system 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device 110 may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
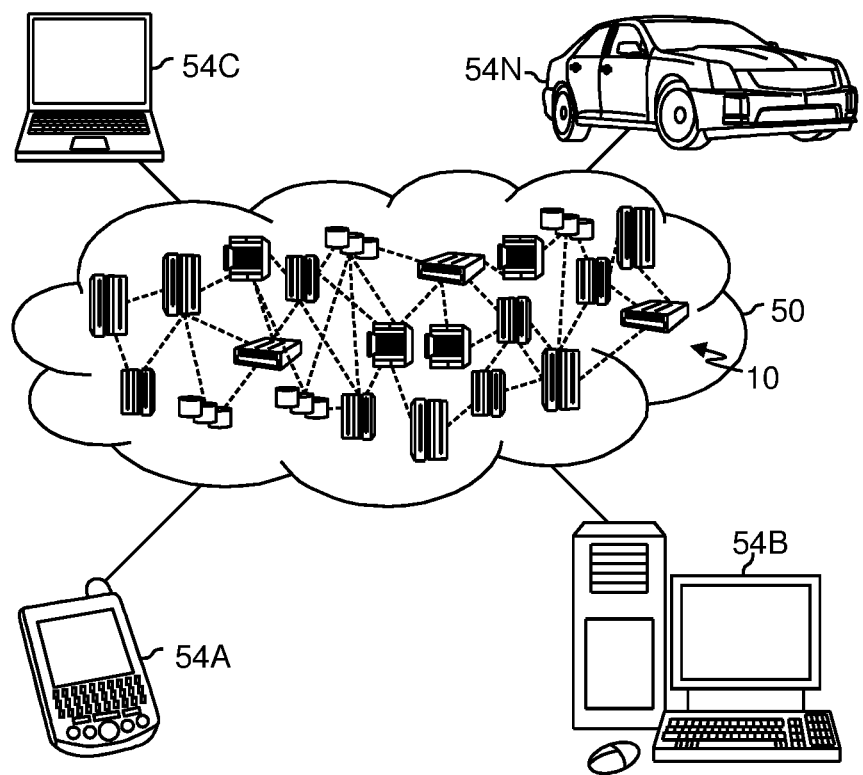
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g. using a web browser).

Figure 5:
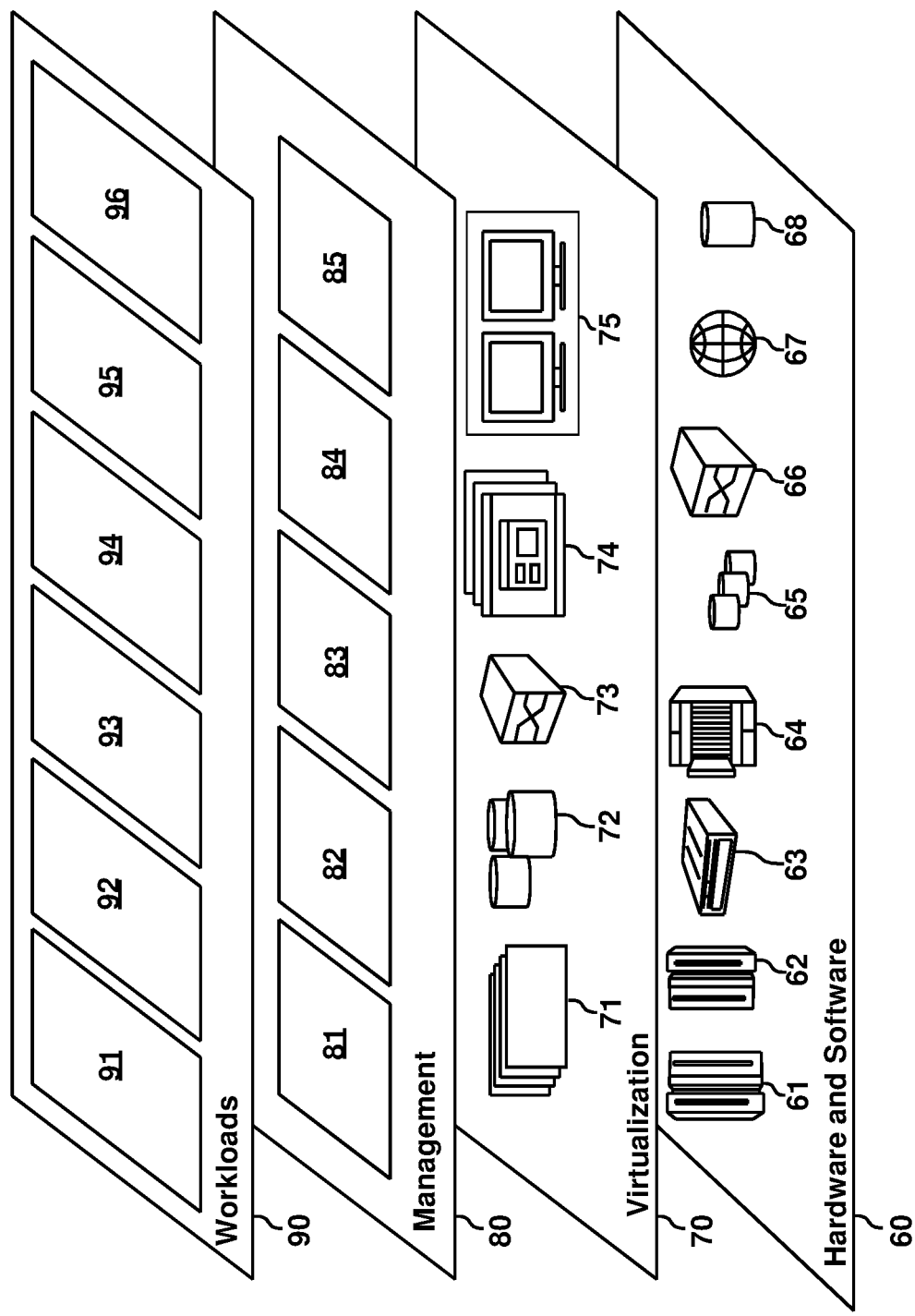
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1-5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for analyzing a physical condition based on at least two images, comprising:
    selecting a plurality of images based on a time lapse interval associated with the plurality of images and a specific physical characteristic being monitored;
    detecting a degree of change in the specific physical characteristic being monitored, wherein the degree of change comprises a change in one or more pixel patterns of at least one image within the plurality of images correlated with the specific physical characteristic being monitored, based on the time lapse interval associated with the plurality of images;
    displaying an alert in response to the degree of change exceeding a prescribed threshold for the specific physical characteristic being monitored;
    in response to the degree of change exceeding the prescribed threshold, mining one or more user activities from the plurality of images, a geographic location, and social network postings for information correlating to the degree of change in the specific physical characteristic being monitored;
    determining that the one or more user activities correlate with the degree of change in the specific physical characteristic being monitored; and
    displaying preventative health information, to a user, based on the determined one or more user activities that correlate with the degree of change in the specific physical characteristic being monitored.

2. The computer-implemented method of claim 1, further comprising:
    normalizing the plurality of images based on the specific physical characteristic being monitored.

3. The computer-implemented method of claim 2, wherein normalizing the plurality of images is selected from a group consisting of adjusting brightness of the at least one image within the plurality of images, cropping the at least one image within the plurality of images to focus on the specific physical characteristic being monitored, and rotating the at least one image within the plurality of images.

4. The computer-implemented method of claim 1, wherein the time lapse interval associated with the plurality of images is customizable based on a specific health issue to be monitored.

5. The computer-implemented method of claim 1, wherein selecting the plurality of images further comprises:
    mining a plurality of sources, wherein the plurality of sources is selected from a group consisting of a social media application, a user computing device, and a third party server.

6. The computer-implemented method of claim 1, further comprising:
    instructing a user to take a new image of the specific physical characteristic being monitored.

* * * * *